3,150,965
METHOD OF PRODUCING GALLIUM
Alfred Mayer, Plainfield, N.J., assignor to Radio Corporation of America, a corporation of Delaware
Filed Mar. 14, 1961, Ser. No. 95,709
2 Claims. (Cl. 75—84.5)

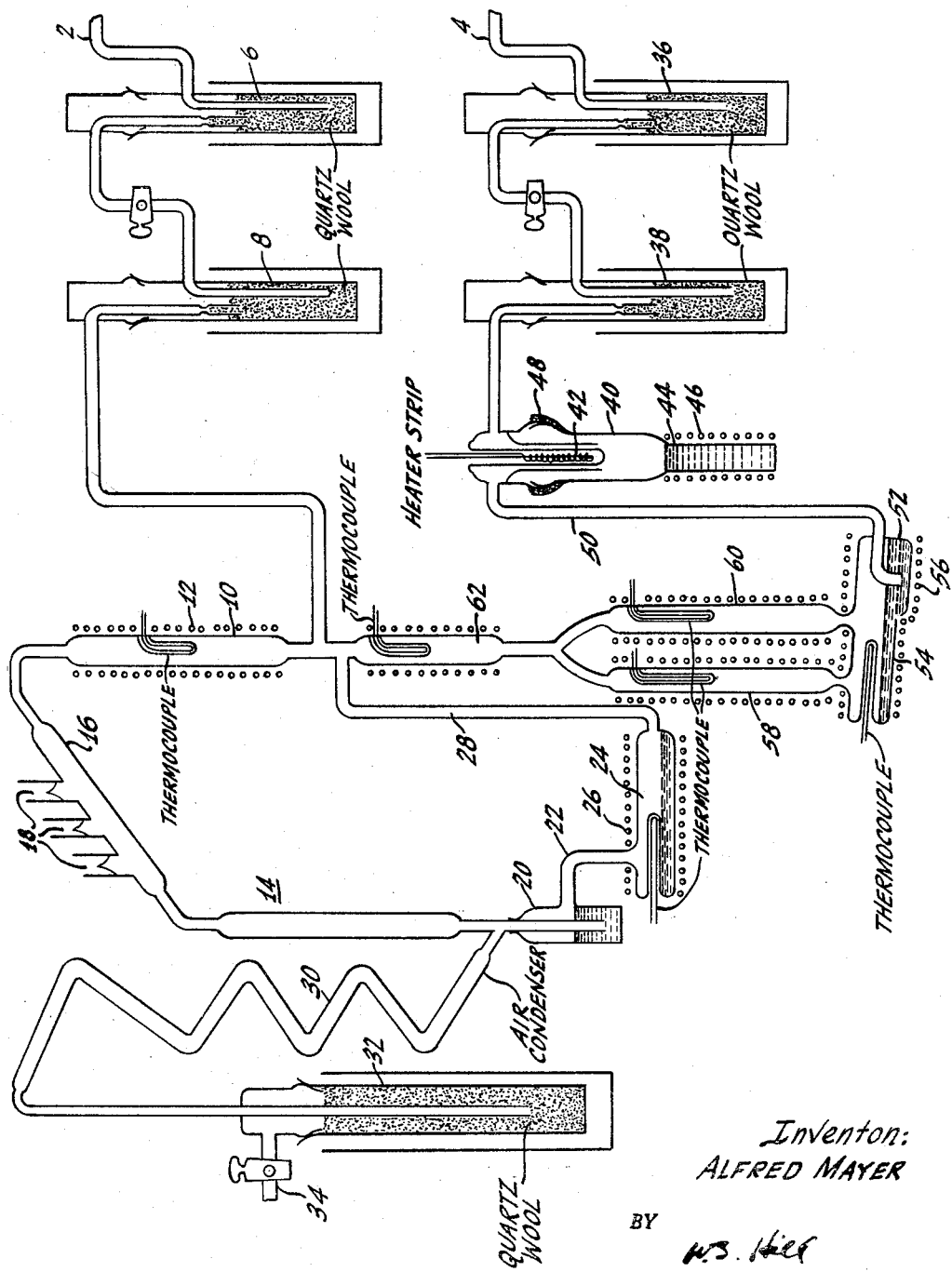

This invention relates to the production of gallium metal of improved purity and, more particularly, to production of high purity gallium by a hydrogen reduction method.

Certain gallium compounds, such as gallium arsenide and gallium phosphide, in a single crystal form, are of interest for making semiconductor devices such as transistors, rectifying diodes, tunnel diodes and photodevices. To be useful in making such devices, the compounds must have an extremely high degree of purity.

In order to make gallium compound crystals of a high degree of purity, it is necessary that the gallium which is used, itself have a very high degree of purity. Since gallium metal, as produced from natural sources of the metal, contains much too high a concentration of impurities to be used directly for making semiconductor device materials, it must be further refined.

A method previously used to purify gallium has been fractional crystallization. However, this method is time-consuming and uneconomical. Another previously used purification method, electrolytic precipitation from alkaline solution, has also proved inadequate.

More recently, it was discovered that relatively pure gallium, still too impure for semiconductor device manufacture, could be further purified by converting it to gallium trichloride, which is a solid at ordinary room temperatures, and zone refining the solid in the manner used to purify germanium. However, it is apparent that after the gallium trichloride has been purified, it must be converted back to gallium without re-introducing unwanted impurities.

One method, previously proposed, of recovering gallium from gallium trichloride is to reduce the compound with previously purified gallium according to the reactions:

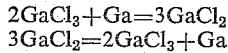

$$2GaCl_3 + Ga = 3GaCl_2$$
$$3GaCl_2 = 2GaCl_3 + Ga$$

This, of course, requires previously purified gallium.

It has been recognized that a more desirable reducing agent would be a carefully purified gas, such as hydrogen. But one difficulty with the reaction:

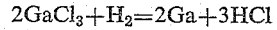

$$2GaCl_3 + H_2 = 2Ga + 3HCl$$

is that the free energy of the reaction at 800° K. is 25.5 kcals. per mol of $GaCl_3$ and the reaction tends to be reversible.

One object of the present invention is to provide an improved method of producing very pure metallic gallium.

Another object of the invention is to provide an improved method of reducing $GaCl_3$ to produce good yields of pure gallium.

A further object of the invention is to provide an improved method of recovering good yields of gallium from very pure gallium trichloride without introducing unwanted impurities.

A feature of the present invention is the provision of an improved method of recovering gallium from gallium trichloride utilizing a reducing gas, such as hydrogen, in a manner such that good yields of gallium are obtained and unreacted gallium trichloride is recirculated rapidly to be repeatedly brought into contact with additional quantities of hydrogen. Briefly, the process comprises vaporizing the gallium trichloride and reacting the vapor with hydrogen such that part of the gallium trichloride reacts with the hydrogen to produce gallium dichloride and hydrogen chloride. The entire reaction mixture is then rapidly chilled to a temperature such that back reaction of gallium dichloride with hydrogen chloride is inhibited and hydrogen chloride is separated from the reaction mixture while the mixture is at the lowered temperature. The gallium dichloride is heated to its boiling point and disproportionates to gallium and gallium trichloride, the gallium trichloride being vaporized and recycled with the rest of this compound in the system.

The invention will be more fully described with the aid of the drawing, the single figure of which illustrates apparatus which has been found suitable for carrying out the method of the invention.

As illustrated in the figure, there are provided two gas inlet tubes 2 and 4. One of these inlet tubes 2 leads successively through two cold traps 6 and 8 filled with quartz wool and adapted to be surrounded with a cooling medium such as liquid nitrogen. From the top of the second cold trap, the inlet line leads to the bottom of a reaction chamber 10, surrounded with a heating coil 12. This reaction chamber forms part of a loop system 14. The loop system includes the reaction chamber 10 and a gas outlet tube 16 one end of which is connected to the top of the reaction chamber. This tube 16 is provided with a plurality of rupturable seals 18. The loop continues with the other end of the tube 16 connected to the top of a liquid trap 20 and the trap is also connected through a lead 22 to a boiler 24 surrounded with a heating element 26. One end of the boiler is connected back to the bottom of the reaction chamber 10 through a tube 28 to complete the loop. A condenser 30 is connected to the top of the trap 20, the other end of the condenser being connected through a cold trap 32 to a gas outlet tube 34. The cold trap is filled with quartz wool and is adapted to contain a cooling medium.

The other gas inlet tube 4 is also led through two successive cold traps 36 and 38 similar in construction to those traps 6 and 8 previously mentioned and thence into a receiver 40 provided with an internal heater 42 in its top portion and having a lower constricted portion 44 provided with an external heater 46. The receiver 40 is sealed into the line by means of a liquid seal 48. From the top of the receiver a line 50 leads to a composite vessel, one portion of which comprises a collecting well 52 and the other portion of which comprises a vaporizor or boiler 54. The boiler is disposed at a higher level than the collecting well. The boiler and the well are heated by means of an external heating coil 56.

Connected to the top of the boiler 54 are two reaction tubes 58 and 60 arranged in parallel. The tops of these two reaction tubes are connected to a single line leading to the bottom of a heating chamber 62 the top of which is connected to the bottom of the previously mentioned reaction chamber 10.

To produce purified gallium in accordance with the invention, the apparatus above described is operated as follows. All parts of the apparatus are carefully cleaned before assembly and after assembly it is baked out under vacuum, the vacuum being applied through the gas inlet leads 2 and 4.

Liquid gallium trichloride is charged through one of the rupturable seals 18 into the tube 16 from whence it runs down through the trap 20 and into the boiler 24. The seal is then closed. Gallium trichloride has a boiling point of 200° C. The gallium trichloride is vaporized in the boiler 24 and the vapor passes through the tubing 28 and into the bottom end of the reaction chamber 10 where it is mixed with hydrogen which is being admitted through the gas inlets 2 and 4. The reaction mixture is at a temperature of about 600° C. Because of the liquid seal of gallium trichloride which always remains in the trap 20, vaporized gallium trichloride can not leave the boiler by the inlet route.

In the reaction chambers 10, gallium trichloride is partially reduced to gallium dichloride, and the hydrogen chloride is also formed as a reaction product. The hydrogen chloride which is formed in this reaction is swept out of the top of the reaction chamber 10 by the incoming hydrogen which continues to sweep through the apparatus, the hydrogen chloride being accompanied in the sweep-out by unreacted gallium trichloride, most of the gallium dichloride and hydrogen. As it leaves the upper end of the reaction chamber 10 the entire mixture, including gallium dichloride, is rapidly chilled to a temperature below 200° C., which causes most of the gallium trichloride and gallium dichloride to condense. The rapid drop in temperature prevents back reaction between the gallium dichloride and hydrogen chloride.

Gallium trichloride and gallium dichloride recirculate through the loop and run back through the trap 20 and into the boiler 24 where they are revaporized. Any gallium trichloride which tends to rise through the condenser 30 is solidified and it can be converted back to a liquid periodically by applying heat to the condenser 30. Gallium trichloride and gallium dichloride vapor flow through the outlet tube 28 from the boiler 24 to the lower end of the reaction chamber 10. In this region, the temperature is below the boiling point of gallium dichloride so the dichloride condenses and runs down through the heated chamber 62 and the reaction tubes 58 and 60 to the vaporizer 54.

The heated chamber is held at a temperature of about 260° to 350° C. At this temperature it serves as a barrier to prevent gallium trichloride from being carried down into the vaporizer along with the gallium dichloride. The boiling point of gallium trichloride being about 200° C., the temperature in the heated chamber 62 must be just sufficiently high to keep the gallium trichloride vaporized while permitting gallium dichloride to remain in a liquid state. Gallium dichloride boils at 450° C.

The hydrogen chloride formed in the reaction taking place in the reaction chamber 10 and any unreacted hydrogen are continuously swept out of the loop system 14 and through the air condenser 30 into cold trap 32 which condenses the hydrogen chloride. The unreacted hydrogen is vented through gas outlet tube 34.

Gallium dichloride, which is vaporized in the vaporizor 54, rises through the parallel reaction tubes 58 and 60 where it is heated to its boiling point and disproportionates in these tubes into gallium trichloride and gallium. The gallium trichloride rises through the heated chamber 62 to join the main stream of gallium trichloride being circulated in the loop 14, while the gallium metal is collected in the well 52.

When practically all of the gallium trichloride has been reacted and only a small amount of gallium dichloride remains in the system, the gallium metal which has been collecting in the well 52 may be sucked back into the receiving vessel 40 by applying a vacuum through the second gas inlet tube 4. The constricted portion 44 of the receiver is kept heated in order to maintain the gallium in a liquid state until it is desired to transfer it out of the apparatus to a different container. When it is desired to take off the gallium and interrupt the operation of the apparatus, the apparatus is flushed by passing helium into both inlet tubes 2 and 4, the liquid gallium seal 48 is removed from the receiver by syphoning, and heat is removed from the constricted portion of the receiver 40. The gallium can be frozen rapidly by immersion in liquid nitrogen.

After attaching another receiver 40 and restoring the liquid gallium seal 48, the apparatus is ready to receive a new charge of gallium trichloride.

The above described method has proved effective in greatly reducing the concentration of many of the impurities normally found in gallium or which tend to accumulate therein due to processing. For example, in one particular run, 260 grams of gallium trichloride (containing 103 grams of gallium) was charged into the reduction apparatus. 93 grams of gallium metal was collected which represented a yield of 90.2% of the theoretical. In the table below, an analysis for a number of impurities is shown for the gallium before purification and after purification:

*Table*

| Analysis | Scrap Ga, p.p.m. | Purified Ga, p.p.m. |
|---|---|---|
| Si | Not reported | <1. |
| Mg | 0.5 | <0.05. |
| Cu | 1.0 | Not detected. |
| Pb | 63.0 | Do. |
| Sn | 15.5 | Do. |
| Fe | 0.3 | Do. |
| Al | 0.5 | Do. |
| Zn | 8.5 | Do. |

The gallium trichloride for charging into the apparatus can be prepared by converting impure scrap gallium to gallium trichloride by direct reaction with chlorine gas. The gallium trichloride can be collected in a quartz tube provided with a rupturable seal, where it is permitted to solidify, and the tube is sealed off under vacuum. The solid ingot of gallium trichloride can then be zone refined. During zone refining in a horizontal position, the impurities become partially concentrated at the ends of the tube. Hence, one or two inches at each end of the refined ingot are usually discarded and the remainder is used for charging the apparatus for obtaining purified gallium.

Although the reaction which occurs in the reaction chamber 10 has been described as a reduction of gallium trichloride to gallium dichloride, it is possible that gallium monochloride also forms temporarily at some stage of the reduction process. However, attempts to identify and isolate gallium monochloride in the reaction zone have not been successful. From this, it appears likely that, if gallium monochloride does form, it exists only momentarily.

The method which has been described above is efficient because the reaction mixture is rapidly chilled after the reduction reaction takes place. This prevents gallium dichloride from reacting with the hydrogen chloride which is present to re-form gallium trichloride. Further improvement lies in efficiently separating the gallium trichloride and gallium dichloride before heating the dichloride to obtain gallium.

The apparatus and method which have been described are capable of producing super-pure gallium metal having a purity of 99.99999% from scrap gallium having a purity of 99.99%. Gallium having the super-purity indicated immediately above, as produced by the present method, has been found suitable for making gallium arsenide and other gallium compounds to be used in making crystalline bodies for semiconductor devices such as transistors and diodes.

What is claimed is:

1. A method of preparing gallium comprising vaporizing gallium trichloride, reacting hydrogen with said vapor to form hydrogen chloride and gallium dichloride, some of said hydrogen and of said trichloride remaining unreacted, rapidly reducing the temperature of the reaction mixture which includes said hydrogen, hydrogen chloride, gallium trichloride and gallium dichloride to a level such that said gallium trichloride and said gallium dichloride condense to a liquid while said hydrogen chloride and hydrogen are in vapor phase and back reaction of said hydrogen chloride with said gallium dichloride is inhibited, sweeping said hydrogen chloride and unreacted hydrogen out of said reaction mixture while said mixture is at said reduced temperature level, revaporizing said gallium trichloride and said gallium dichloride and bringing said revaporized trichloride and dichloride into contact with a zone maintained at a temperature such that said trichloride remains in the vapor state and said dichloride condenses to a liquid, separating said dichloride liquid from said trichloride vapor, heating said last-mentioned dichloride liquid to a temperature such that said last-mentioned dichloride disproportionates to gallium and gallium trichloride, condensing said gallium, and causing said last-mentioned gallium trichloride to be recirculated in the reaction above described, with said previously-mentioned trichloride.

2. A method of preparing gallium comprising vaporizing gallium trichloride, reacting hydrogen with said vapor to form hydrogen chloride and gallium dichloride, at a temperature of about 600° C., some of said hydrogen and of said trichloride remaining unreacted, rapidly reducing the temperature of the reaction mixture which includes said hydrogen, hydrogen chloride, gallium trichloride and gallium dichloride below 200° C. at which temperature said gallium trichloride and said gallium dichloride condense to a liquid while said hydrogen chloride and said hydrogen are in vapor phase, sweeping said hydrogen chloride and unreacted hydrogen out of said reaction mixture, revaporizing said gallium trichloride and said gallium dichloride and bringing said revaporized trichloride and dichloride into contact with a zone maintained at a temperature of about 260° to 350° C. such that said trichloride remains in the vapor state and said dichloride condenses to a liquid, separating said dichloride liquid from said trichloride vapor, heating said last-mentioned dichloride liquid to a temperature such that said last-mentioned dichloride disproportionates to gallium and gallium trichloride, condensing said gallium, and causing said last-mentioned gallium trichloride to be recirculated, in the reaction above described, with said previously-mentioned trichloride.

References Cited in the file of this patent
UNITED STATES PATENTS

| | | |
|---|---|---|
| 1,173,012 | Meyer et al. | Feb. 22, 1916 |
| 2,928,731 | Gebauhr | Mar. 15, 1960 |